US010132165B2

(12) United States Patent
Simmons et al.

(10) Patent No.: US 10,132,165 B2
(45) Date of Patent: Nov. 20, 2018

(54) ANCHORING SYSTEMS FOR MINES

(75) Inventors: Walter John Simmons, Martinsburg, WV (US); Walter Neal Simmons, Bahama, NC (US)

(73) Assignee: Terrasimco, Inc., Martinsburg, WV (US)

( * ) Notice: Subject to any disclaimer, the term of this patent is extended or adjusted under 35 U.S.C. 154(b) by 0 days.

(21) Appl. No.: 13/291,990

(22) Filed: Nov. 8, 2011

(65) Prior Publication Data
US 2012/0114428 A1 May 10, 2012

Related U.S. Application Data

(63) Continuation of application No. PCT/US2011/059663, filed on Nov. 7, 2011.

(60) Provisional application No. 61/410,933, filed on Nov. 7, 2010.

(51) Int. Cl.
*E21D 20/02* (2006.01)
*C04B 28/04* (2006.01)
*C04B 28/14* (2006.01)
*C04B 111/70* (2006.01)

(52) U.S. Cl.
CPC ............ *E21D 20/023* (2013.01); *C04B 28/04* (2013.01); *C04B 28/145* (2013.01); *C04B 2111/70* (2013.01)

(58) Field of Classification Search
CPC .. C09K 8/46; C09K 17/10; E02D 3/12; E02D 29/00
USPC ........ 106/713, 724, 772, 778; 206/218, 223, 206/528, 532, 538; 405/259.1, 259.2, 405/259.5, 259.6, 266, 267
See application file for complete search history.

(56) References Cited

U.S. PATENT DOCUMENTS

| | | | |
|---|---|---|---|
| 2,756,874 A * | 7/1956 | Erickson et al. ............ 206/221 |
| 2,756,875 A * | 7/1956 | Yochim ......................... 206/219 |
| 3,087,606 A * | 4/1963 | Vokaty et al. ................ 206/219 |
| 3,108,443 A * | 10/1963 | Schuermann et al. ...... 405/259.6 |
| 3,302,410 A * | 2/1967 | McLean ..................... 405/259.6 |
| 3,324,663 A * | 6/1967 | McLean ................. C09K 17/20 206/219 |
| 3,385,427 A * | 5/1968 | Stouls ....................... 405/259.6 |
| 3,399,760 A * | 9/1968 | Hechler, IV .................. 383/207 |
| 3,430,449 A * | 3/1969 | Novotny et al. .......... 405/259.6 |
| 3,474,898 A | 10/1969 | Montgomery |
| 3,705,646 A * | 12/1972 | Jankowski et al. .......... 206/219 |
| 3,731,791 A * | 5/1973 | Fourcade ............ C04B 40/0666 206/219 |
| 3,756,388 A | 9/1973 | Murphy |
| 3,795,081 A | 3/1974 | Brown, Jr. et al. |
| 3,861,522 A * | 1/1975 | Llewellyn et al. .......... 206/219 |
| 3,889,446 A | 6/1975 | Simmons et al. |
| 3,921,800 A * | 11/1975 | Burns ........................... 206/219 |
| 3,953,565 A | 4/1976 | Mizutani et al. |
| 4,096,944 A * | 6/1978 | Simpson ....................... 206/219 |
| 4,103,771 A | 8/1978 | Klatt et al. |
| 4,105,114 A | 8/1978 | Knox et al. |
| 4,126,003 A * | 11/1978 | Tomic ........................ 405/259.6 |
| 4,126,005 A * | 11/1978 | Coursen ..................... 405/259.6 |
| 4,126,009 A * | 11/1978 | Tomic ........................ 405/259.5 |
| 4,127,001 A * | 11/1978 | Tomic ........................ 405/259.6 |
| 4,136,774 A | 1/1979 | Ghoshal |
| 4,153,156 A * | 5/1979 | Seemann et al. ............. 206/219 |
| 4,167,359 A | 9/1979 | Beveridge |
| 4,239,105 A * | 12/1980 | Gilbert ......................... 206/219 |
| 4,272,475 A | 6/1981 | Chi |
| 4,280,943 A | 7/1981 | Bivens et al. |
| 4,324,592 A * | 4/1982 | Patel et al. ................... 106/691 |
| 4,343,399 A * | 8/1982 | Patel et al. ................. 405/259.6 |
| 4,372,708 A | 2/1983 | Bower et al. |
| 4,378,181 A * | 3/1983 | Beveridge et al. ........ 405/259.6 |
| 4,391,931 A * | 7/1983 | Haigh et al. ................ 523/318 |
| 4,402,633 A | 9/1983 | Self |
| 4,436,204 A * | 3/1984 | Sowinski ..................... 206/525 |
| 4,487,529 A * | 12/1984 | Douty ........................ 405/259.6 |
| 4,516,884 A * | 5/1985 | Douty ........................ 405/259.6 |
| 4,528,792 A * | 7/1985 | Cross et al. ................... 52/704 |
| 4,534,795 A * | 8/1985 | Lewis et al. ................. 106/696 |
| 4,558,781 A * | 12/1985 | Murphy et al. .............. 206/219 |
| 4,616,050 A | 10/1986 | Simmons et al. |

(Continued)

OTHER PUBLICATIONS

Office Action for Chinese patent application No. 201180064388.6 dated Dec. 19, 2014, along with translation thereof.
Office Action for Chinese patent application No. 201180064388.6 dated Feb. 23, 2016, along with translation thereof.
C. W. Sweitzer et al., "Cure of Carbon Black-Unsaturated Polyester Mixtures," Industrial and Engineering Chemistry, vol. 47, No. 11, Nov. 1955, 2380-2385.

(Continued)

*Primary Examiner* — James E McDonough
(74) *Attorney, Agent, or Firm* — Watkins Law & Advocacy, PLLC

(57) ABSTRACT

A grouting system for anchoring a reinforcement in a mine includes a package that is a tubular member formed of polymer film and has discrete first and second compartments. Hardenable cementitious material that is a hydratable substance and water is disposed in the first compartment. A method of forming a resin grouting capsule includes: injecting a hardenable material into a first compartment of the capsule having resin mastic; wherein the hardenable material does not substantially react with the resin mastic when injected into the first compartment. Another method of forming a resin grouting capsule includes: injecting a hardenable material into a first compartment of the capsule having catalyst mastic; wherein the hardenable material does not substantially react with the catalyst mastic when injected into the first compartment.

71 Claims, No Drawings

(56) References Cited

U.S. PATENT DOCUMENTS

| | | | |
|---|---|---|---|
| 4,661,161 A * | 4/1987 | Jakacki | C04B 28/145 106/648 |
| 4,729,696 A * | 3/1988 | Goto et al. | 405/259.6 |
| 4,772,326 A * | 9/1988 | Heinen et al. | 106/645 |
| 4,891,072 A * | 1/1990 | Cooper | 106/660 |
| 4,894,269 A * | 1/1990 | Kimura | 428/43 |
| 4,961,790 A * | 10/1990 | Smith et al. | 106/823 |
| 5,161,915 A | 11/1992 | Hansen | |
| 5,389,706 A | 2/1995 | Heathman et al. | |
| 5,397,202 A | 3/1995 | Shrader et al. | |
| 5,544,981 A | 8/1996 | Nishida et al. | |
| 5,624,980 A | 4/1997 | Kobori | |
| 5,653,797 A | 8/1997 | Patel | |
| 5,763,026 A * | 6/1998 | Makino et al. | 428/34.4 |
| 5,993,116 A | 11/1999 | Paxton et al. | |
| 5,999,316 A | 11/1999 | Paxton et al. | |
| 6,298,984 B1 * | 10/2001 | Weaver et al. | 206/222 |
| 6,348,093 B1 * | 2/2002 | Rieder et al. | 106/724 |
| 6,506,246 B1 | 1/2003 | Cheriton et al. | |
| 6,541,545 B1 * | 4/2003 | Simmons | C09K 17/32 156/327 |
| 6,545,068 B1 | 4/2003 | Simmons et al. | |
| 6,583,217 B1 | 6/2003 | Li et al. | |
| 7,270,233 B2 * | 9/2007 | Kindt | 206/219 |
| 7,351,756 B2 | 4/2008 | Simmons et al. | |
| 7,411,010 B2 | 8/2008 | Kish et al. | |
| 7,681,377 B2 | 3/2010 | Simmons et al. | |
| 7,775,745 B2 * | 8/2010 | Simmons et al. | 405/259.6 |
| 8,444,350 B2 | 5/2013 | Wharton et al. | |
| 2008/0178769 A1 * | 7/2008 | Goodwin et al. | 106/690 |
| 2008/0221236 A1 | 9/2008 | Clingerman et al. | |
| 2009/0220767 A1 | 9/2009 | Schlogl et al. | |
| 2011/0100844 A1 * | 5/2011 | Cimaglio et al. | 206/219 |
| 2012/0067250 A1 * | 3/2012 | Bracegirdle | 106/638 |

OTHER PUBLICATIONS

Examination report No. 1 for Australian patent application No. 2017201024 dated Apr. 6, 2018.

Examination report No. 1 for Australian patent application No. 2017201026 dated Nov. 21, 2017.

Examination report No. 1 for Australian patent application No. 2011323061 dated Feb. 17, 2016.

Office Action for Canadian patent application No. 2,822,568 dated Feb. 28, 2018.

Office Action for Chinese patent application No. 201180064388.6 dated Aug. 3, 2016, along with translation thereof.

* cited by examiner

ANCHORING SYSTEMS FOR MINES

CROSS-REFERENCE TO RELATED APPLICATIONS

This application is a continuation of the U.S. National Stage designation of co-pending International Patent Application PCT/US11/59663 filed Nov. 7, 2011 by Walter John Simmons and Walter Neal Simmons and entitled "Anchoring Systems for Mines," and claims the benefits of Provisional Application No. 61/410,933 filed Nov. 7, 2010 by Walter John Simmons and Walter Neal Simmons and entitled "Anchoring Systems for Mines" under 35 U.S.C. § 119(e), and the entire contents of these applications are expressly incorporated herein by reference thereto.

FIELD OF THE INVENTION

The invention relates to anchoring systems and methods of use thereof. The invention further relates to resin cartridges for anchoring bolts and other supports in mines.

BACKGROUND OF THE INVENTION

The primary roof support systems used in coal mines include headed rebar bolts typically 4 feet to 6 feet in length, ¾ inch and ⅝ inch in diameter, and used in conjunction with resin grouting in 1 inch diameter holes.

Multi-compartment resin cartridges are used to supply the resin grouting for the support systems. Among the cartridges known for this purpose are those disclosed in U.S. Pat. No. 3,795,081 to Brown, Jr. et al., U.S. Pat. No. 3,861,522 to Llewellyn et al., U.S. Pat. No. 4,239,105 to Gilbert, and U.S. Pat. No. 7,681,377 B2 to Simmons et al., the entire contents of each being incorporated herein by reference thereto. Cartridges typically are available in a variety of lengths ranging from 2 feet to 6 feet and in diameter from ¾ inch to 1¼ inch. The cartridges also typically include two compartments: a first compartment with a reinforced, thixotropic, polyester resin mastic (a fluid) therein, and a second compartment with an organic peroxide catalyst (also a fluid) therein. The resin and catalyst are segregated from one another in order to prevent a reaction prior to puncturing of the compartments to allow contact and mixing to occur.

In use, a cartridge and bolt (or other reinforcing member) are placed in a borehole so that they abut one another. In order to puncture the cartridge so that the contents of the compartments may be released and mixed, the bolt for example may be rotated in place to shred the cartridge, thereby mixing the components and permitting solidification of the mastic. Mixing of the resin and catalyst (due to cartridge rupture as well as spinning of the bolt in the borehole) results in hardening that allows the bolt to be held in place.

There has long been a need, heretofore unsolved and unmet, for a resin cartridge that remains generally firm prior to use in a borehole in a mine for retaining a bolt in place. Known resin cartridges, as described above, have limited firmness due to the pressure of the resin/and or catalyst in the compartments of the cartridge. In other words, because the compartments are substantially filled and sealed at the time of manufacture, the cartridges tend to have some limited resistance to bending. However, over time, the cartridges have a tendency to become limp. The rapid loss of firmness that occurs after cartridge manufacture is due to several factors including creep of the packaging film as well as loss of some of the contents from the cartridge due to diffusion through the film that forms the cartridge or leakage proximate the ends of the cartridge. The catalyst used in the multi-compartment cartridges, for example, is water-based, and water diffuses from the catalyst through the cartridge film. Polyester film typically is used to form the cartridge; polyester is substantially impermeable with respect to the resin, but not water in the catalyst. The polyester film typically is between 0.001 and 0.005 inch thick. Although multi-layered films could be used or films with metal coatings to decrease the loss of water through the film, this adds expense and would not solve all of the rigidity issue.

Cartridges typically are manufactured and sold in bulk and often are not used immediately after manufacture. The loss of rigidity from the as-manufactured state can occur for example over a period of 1 week to 6 months prior to use of the cartridge in a mine, and cartridge limpness is one of the primary reasons that cartridges are discarded prior to use or rejected by customers purchasing the cartridges. This is because limpness causes the cartridge to buckle at one or more locations over its length when handled by mining personnel. When the cartridges is installed in a borehole in the roof of a mine, for example, it is held from a bottom end and inserted in the hole. However, due to the long length of the cartridge coupled with the loss of rigidity, the cartridge can be difficult to insert in the hole because it flops over when oriented vertically. This can be analogized to pushing a wet noodle into a hole of similar size, i.e., a difficult task. Thus, there is a need for a cartridge that does not have such a "shelf-life" issue, e.g., that remains generally stiff prior to installation in a borehole.

When multi-compartment resin cartridges are manufactured, such as in the form of partitioned film packages, a series of cartridges may be formed using a package-forming apparatus. The cartridges may be separated from one another at a clipping head associated with the package-forming apparatus, where the cartridges are cut from one another and sealed. Alternatively, a series of cartridges may be separated from one another in a different operation from the cartridge forming operation, i.e., off-line using a cutter separate from the clipping head. In particular, the cartridges may be separated from one another proximate their clipped ends, i.e., proximate the regions of the opposite ends of the cartridges which are each clipped so as to retain the resin and catalyst in the package. Thus, before being separated, adjacent cartridges have two clips adjacent each other with some cartridge packaging disposed therebetween. A cut is made between the adjacent clips to separate the cartridges.

U.S. Pat. No. 4,616,050 to Simmons et al. discloses filler-containing hardenable resin products. In particular, a hardenable resin composition is disclosed that is adapted for use in making set products, e.g., a hardened grout for anchoring a reinforcing member in a hole. A course/fine particulate inert solid filler component, e.g., limestone and/or sand, is used. In one composition, a resin component and a catalyst component are provided in a 70:30 percentage ratio. In one example, the resin component is describes as a mixture of 21% of a resin formulation and 79% filler (limestone or limestone in combination with sand). The base resin formulation consisted approximately of 64.0% of a polyester resin, 17.1% styrene, 14.2% vinyl toluene, 1.9% fumed silica, and 2.9% stabilizers and promoters. The polyester resin was the esterification product of maleic anhydride, propylene glycol, and diethylene glycol, the maleic anhydride having been partially replaced with phthalic anhydride (30% maleic anhydride, 23% phthalic anhydride, 17% propylene glycol, and 30% diethylene glycol). The catalyst component was a mixture of 72.5% filler (i.e., limestone), 19.1% water, 0.4% of methylcellulose, and 8.0% of a benzoyl peroxide (BPO) catalyst paste consisting, approximately, of 49.3% BPO, 24.7% butyl phenyl phthalate, 14.8% water, 7.9% polyalkylene glycol ether, 2.0% zinc stearate, and 1.3% fumed silica. Two grades of limestone were used as specified in Table I, and both "coarse" and "fine" filler particles were used. Examples of disclosed compositions are as follows:

TABLE I

| Product | Filler |
|---|---|
| Product I | Filler in Resin: [12.5% coarse particles and 87.5% fine particles]<br>38% "Grade A" limestone: 33% of the particles averaged larger<br>than 1.19 mm (with 10% of these larger than 2.3 mm,<br>3% larger than 4.76 mm, and none larger than 9.53 mm);<br>an average of 42% of the particles were smaller than 0.59 mm<br>(with 17% smaller than 0.297 mm, and 5% smaller than<br>0.149 mm)<br>62% "Grade B" limestone: an average of 99.8% of the<br>particles were smaller than 0.84 mm, with 98.7% smaller<br>than 0.297 mm, 97.9% smaller than 0.250 mm,<br>91.5% smaller than 0.149 mm, and 69.6% smaller than<br>0.074 mm<br>Filler in Catalyst: 100% Grade B limestone |
| Product II | Filler in Resin: [31.9% coarse particles and 68.1% fine particles]<br>38% sand: 83.9% of the particles averaged larger than<br>1.00 mm (with 59.6% of these larger than 1.19 mm);<br>6.6% of the particles averaged smaller than 0.84 mm<br>(with 1.9% smaller than 0.59 mm, 0.8% smaller than 0.42 mm,<br>and 0.2 smaller than 0.297 mm)<br>62% Grade B limestone<br>Filler in Catalyst: 100% Grade B limestone |
| Product III | Filler in Resin: 100% Grade B limestone<br>Filler in Catalyst: 100% Grade B limestone |
| Product V | Filler in Resin: [12.4% coarse particles, 87.6% fine particles]<br>37.5% Grade A limestone<br>62.5% Grade B limestone<br>Filler in Catalyst: 100% Grade B limestone |
| Product VI | Filler in Resin: 62.5% Grade B limestone<br>37.5% coarse sand all particles passed through a 3.18-mm<br>screen and were held on a 1.59-mm screen<br>Filler in Catalyst: 100% Grade B limestone |

As used herein, the terms "grouting," "grouting system," "grout," and "grout system" mean a substance that hardens to anchor a reinforcing member in a space. For example, grouting can be provided in the form of a cartridge with a compartment housing a polyester resin and a compartment housing an initiator/catalyst, such that when the cartridge is shredded and the resin is mixed with the initiator/catalyst, a reinforcing member can be anchored in a space.

In manufacturing grouting, from a materials cost perspective, as more filler is used the cost becomes less expensive. In other words, the more filler used instead of actual resin or catalyst, the less expensive the materials required to form the composition. Moreover, filler permits better performance to be achieved by increasing the strength of the hardened grout. However, the tradeoff with using more filler in a composition is that the composition becomes more viscous. For example, the more that filler is used in the resin, the more difficult it is to pump the resin mastic into the package (cartridge) because the resin becomes "thick" (the viscosity increases). High resin mastic pumping pressures become necessary with such high viscosity compositions. Also, the more that filler is used in the overall grouting composition, the more difficult it becomes for the mine bolt to be able to penetrate the cartridge when spun.

In basic principle, when larger (e.g., coarse) filler particles are used in a composition, the particles overall provide lower surface area than when smaller (e.g., fine) particles are used. Use of such larger particles thus permits a lower viscosity grouting and advantageously aids in shredding of the cartridge and mixing of the cartridge components. In contrast, smaller (e.g., fine) particles can have a very substantial effect on viscosity of a composition because of the high overall surface area that they provide. The use of larger (e.g., coarse) filler particles involves other tradeoffs as well. The resin and catalyst are delivered to the packaging (cartridge) through so-called fill tubes, which are sized to be accommodated with respect to the compartments of the cartridge. The fill tubes thus can only be of a certain diameter in order to be used in the cartridge manufacturing process. The internal diameter of the fill tubes limits the size of the filler particles that can be delivered through those tubes. Separately, when cartridges are clipped at either end during the manufacturing process to seal the resin and catalyst within the cartridge, larger diameter particles can interfere with the clips, causing leakage of resin or catalyst proximate the cartridge free ends and/or rupture of the cartridge when the cartridge is squeezed during installation of a clip. For example, large solid particles can lodge under the metal clips and rupture the cartridge film due to their sharp edges or form passages that allow the resin to slowly leak from the cartridge ends. Leakage of resin can be problematic because the cartridges can become messy to handle and also can become stuck to one another.

The use of larger diameter filler particles thus can result in a higher rejection rate of manufactured product due to quality control. For these reasons, it is known that clipping requirements are a limiting factor in the filler particle size used in grouting. Prior art compositions, for example, have had a maximum particle size of 3/16 inch. But even then, if a particle of such maximum size is present proximate a clip, the cartridge typically ruptures and has to be discarded rather than sold. It is for this reason that during cartridge manufacture, only a small percentage of larger (e.g., coarse) filler particles are used (e.g., 0-5%) such that the number of rejected cartridges due to leakage and/or rupture remains tolerable (e.g., 1-2%).

Regardless of the size of the filler particles, the presence of any resin on the clipped ends can be problematic because the resin contains volatile styrene that can be smelled in concentrations as low as 1 part pre million. Thus, warehouses, trucks, and storage areas used for the cartridges become unpleasant due to the strong smell of styrene. The escape of styrene to the atmosphere also is an environmental hazard. There is a need for cartridge clipping in which the areas proximate the clips remain substantially free of resin/ styrene (such that all the styrene is used during the reaction when the resin mastic is mixed with the catalyst mastic). Form fill hardware already in use for forming the cartridges use rollers to squeeze the outside of the cartridge in the areas to receive a clip, just before the clip is applied. While such an approach works for cartridges with resin mastic and/or catalyst mastic that do not have high filler levels, compositions with high filler levels prevent the rollers from adequately expelling mastic from proximate the ends of the cartridge and in any case leave a film of resin on the surface of the cartridge with styrene that evaporates into the atmosphere.

Given that the use of fillers was contemplated in resins for mine bolt grouting since at least the mid-1960s, e.g., as disclosed in U.S. Pat. No. 3,731,791 to Fourcade et al., there has been a long-felt but unsolved need for methods and apparatuses for addressing cartridge clip leakage elimination. There also has been a long felt but unsolved need for methods and apparatuses for stiffened cartridges.

Another type of cartridge used today is a dry cement packaged in a porous membrane cartridges (Tyvek, Canvas, etc.). The cartridges are typically 25 to 32 mm in diameter and 0.5 to 2 meters in length. In use, the cartridge is submerged in a container of water for 1 to 5 minutes; water permeates the membrane and diffuses into the cement. The cartridge then is inserted into the borehole and the mine bolt is inserted to puncture the cartridge. The cement typically hardens in 10 minutes to 24 hours. Among the disadvantages to this type of cartridge are that it is very labor intensive to package the dry cement in long, small diameter cartridges, it is very labor intensive in the mine to submerge the cartridges in water, there is great sensitivity to the time the cartridge is submerged in water (too short and not enough water, or too long and too much water), and the setting time must be long so the cement does not set when cartridge is soaking in water. Thus, there is a need for an improved cartridge.

SUMMARY OF THE INVENTION

A grouting system for anchoring a reinforcement in a mine includes a package that is a tubular member formed of polymer film and has discrete first and second compartments. Hardenable cementitious material that is a hydratable substance and water may be disposed in the first compartment. The first end may set faster than the second end.

In one exemplary embodiment, the second compartment further includes at least one component selected from the group consisting of thickening agent, liquefying agent, filler, and water. The hardenable cementitious material may be calcium sulphate hemihydrate or Portland cement. Resin mastic may be disposed in one of the first and second compartments and catalyst mastic may be disposed in another of the first and second compartments. Retarder may be disposed in the first compartment, wherein the amount of retarder may vary from the first end of the package to the second end of the package.

In some exemplary embodiments, the hardenable cementitious material may be a slurry of cement and water. Further, activator may be disposed in resin mastic or catalyst mastic. Also, the grouting system may also include fluid sealant disposed proximate the first and second ends of the package.

A polyester resin mastic may be further disposed in the first compartment. Also, an organic peroxide catalyst may be further disposed in the second compartment.

In an exemplary embodiment, resin mastic is disposed in the first compartment proximate the first end of the package and the hardenable cementitious material is disposed in the first compartment proximate the second end of the package; in addition, catalyst mastic is disposed in the second compartment proximate the first end of the package and activator is disposed in the second compartment proximate the second end of the package.

Resin mastic including polyester may be disposed in the first compartment. Catalyst mastic including peroxide may be disposed in the second compartment.

In some embodiments, the hardenable cementitious material may be disposed as a layer on an inner surface of the first compartment. The layer may have a thickness between 0.005 inch and 0.125 inch. The hardenable cementitious material may be Portland cement or calcium sulphate hemihydrate. The layer may coat substantially the entire inner surface of the compartment over substantially the entire length thereof. Catalyst and hardenable cementitious material may be further disposed in the second compartment. The first compartment may have an inner surface and the hardenable cementitious material may be disposed remote from the inner surface. The hardenable cementitious material may be disposed proximate a central longitudinal axis of the first compartment. The hardenable cementitious material may be a rod extending for a substantial length of the first compartment. The rod may have a thickness between 0.125 inch and 0.5 inch. The hardenable cementitious material may be disposed proximate a longitudinal axis of the first compartment. The hardenable cementitious material may be a rod extending for a substantial length of the first compartment. The rod may have a thickness between 0.125 inch and 0.5 inch. The first compartment may have 5% to 50% hardenable cementitious material by volume. The hardenable cementitious material may have particles greater than $3/16$ inch in largest dimension. At least 10% of the particles may be greater than $3/16$ inch in largest dimension.

The first compartment may have 50% to 95% resin mastic by volume and the resin mastic may be polyester resin. At least one of the first and second compartments may have calcium sulphate hemihydrate, water, and a set retarder. The set retarder may be a hydration inhibitor. In some embodiments, resin mastic may be further included in the compartment with the calcium sulphate hemihydrate, water, and set retarder. In some embodiments, catalyst mastic may be further included in the compartment with the calcium sulphate hemihydrate, water, and set retarder.

The grouting system further may include activator disposed in the second compartment and having soluble ions of at least one element consisting of iron, aluminum, zinc, and copper.

The grouting system may further include activator disposed in the second compartment. The amount of activator may vary from a first end of the package to a second end of the package. The first end may set faster than the second end when the cementitious material and the activator are combined. Also, the hardenable cementitious material may be retarded. A reinforced, thixotropic polyester resin mastic may be further disposed in the first compartment.

Another exemplary grouting system for anchoring a reinforcement in a mine includes a package that is a tubular member formed of polymer film and having discrete first and second compartments, and a reacting, hardenable material disposed in at least one of the first and second compartments. A polyester resin mastic may be further disposed in the first compartment. Also, an organic peroxide catalyst may be further disposed in the second compartment.

An exemplary method of forming a resin grouting capsule may include: injecting a hardenable material into a first compartment of the capsule comprising resin mastic; wherein the hardenable material does not substantially react with the resin mastic when injected into the first compartment. In some embodiments, the hardenable material substantially hardens between 5 seconds and 1 day after the capsule is formed. The hardenable material may form a body with a cross-sectional thickness between 0.1 mm and 10 mm in largest dimension. The body may be at least 1 mm in length. Also, the body may form a rod extending from a first end of the first compartment to a second end of the first compartment. The hardenable material may be 2% to 50% of total grout volume disposed in the capsule. Also, the hardenable material may have a hardness that is 10% to 150% of a hardness of filler disposed in the capsule. The hardenable material may be Portland cement and water, or calcium sulphate hemihydrate and water. The hardenable material may be an inorganic material. Alternatively, the hardenable material may be an organic compound. The hardenable material may be continuously injected to form a plurality of resin grouting capsules. Alternatively, the hardenable material may be intermittently injected at a frequency of 10 cycles per second to 1 cycle per minute to form a plurality of bodies within the first compartment. The hardenable material may harden to form a body that has a dimension at least 20% of an axial cross-section of a fill tube used to pump mastic into the compartment or at least 50% of an axial cross-section of a fill tube used to pump mastic into the compartment. The hardenable material may not be miscible with resin mastic. Further, the hardenable material may be disposed proximate first and second ends of the first compartment.

Another exemplary method of forming a resin grouting capsule may include: injecting a hardenable material into a first compartment of the capsule comprising catalyst mastic; wherein the hardenable material does not substantially react with the catalyst mastic when injected into the first compartment. In some embodiments, the hardenable material substantially hardens between 5 seconds and 1 day after the capsule is formed. The hardenable material may form a body with a cross-sectional thickness between 0.1 mm and 10 mm in largest dimension. The body may be at least 1 mm in length. Also, the body may form a rod extending from a first end of the first compartment to a second end of the first compartment. The hardenable material may be 2% to 50% of total grout volume disposed in the capsule. Also, the hardenable material may have a hardness that is 10% to 150% of a hardness of filler disposed in the capsule. The hardenable material may be Portland cement and water, or calcium sulphate hemihydrate and water. The hardenable material may be an inorganic material. Alternatively, the hardenable material may be an organic compound. The hardenable material may be continuously injected to form a plurality of resin grouting capsules. Alternatively, the hardenable material may be intermittently injected at a frequency of 10 cycles per second to 1 cycle per minute to form a plurality of bodies within the first compartment. The hardenable material may harden to form a body that has a dimension at least 20% of an axial cross-section of a fill tube used to pump mastic into the compartment or at least 50% of an axial cross-section of a fill tube used to pump mastic into the compartment. The hardenable material may not be miscible with catalyst mastic. Further, the hardenable material may be disposed proximate first and second ends of the first compartment.

DETAILED DESCRIPTION OF THE PREFERRED EMBODIMENTS

As used herein, the term "mastic" means liquid component with filler. For example, there can be resin mastic (liquid component plus filler) as well as catalyst mastic (liquid component plus filler).

As used herein, the terms "catalyst" and "initiator" mean a substance that initiates polymerization and optionally is consumed during polymerization.

In a first exemplary embodiment, a thin layer of stiffening material is injected onto the inside of the cartridge film during manufacture of the cartridge. In one exemplary embodiment, the stiffening material forms a thin layer on the inner surface of the compartment for the catalyst mastic. In another exemplary embodiment, the stiffening material forms a thin layer on the inner surface of the compartment for the resin mastic. In yet another exemplary embodiment, the stiffening material is injected onto the inside of the cartridge on the inner surfaces of both the compartment for the catalyst mastic and the compartment for the resin mastic. And in yet another exemplary embodiment, the stiffening material is injected into a compartment separate from the compartments for the catalyst mastic and resin mastic, where optionally it can fill that compartment.

The thin layer may be between 0.005 and 0.125 inches thick. Preferably, the thin layer hardens in 15 seconds to several days, for example in 1 minute to several days, and more preferably in no more than 3 hours, after being injected onto the inside of the cartridge film. The cartridge remains flexible for applying end closures (e.g., metal clips) and cutting adjacent cartridges from one another after filling the compartments and yet becomes rigid following manufacture prior to the end user being provided with the cartridge.

The injection of stiffening material may be continuous or pulsating.

Preferred exemplary stiffening materials for forming the thin layer on the inside of the cartridge include Portland cement mixed with water and fillers such as sand, limestone, and/or calcium sulphate hemihydrate (nominally $CaSO_4 \cdot \frac{1}{2}H_2O$, which becomes gypsum when hydrated and hardened) due to their low cost and high strength. Other stiffening materials for use as the thin layer include other hardenable materials that are compatible with unsaturated polyester resin or BPO catalyst slurries, and for example include epoxies (e.g., premixed chemical set compositions) although such materials are expensive.

Preferably, the stiffening material does not substantially mix with other materials in the compartments of the cartridge during manufacture. Also, preferably the stiffening material is sufficiently friable or brittle such that during bolt insertion and particularly spinning to shred the cartridge and mix the resin mastic and catalyst mastic, the hardened stiffening material crumbles or otherwise breaks into pieces and is mixed with the resin mastic and catalyst mastic.

In some exemplary embodiments, the stiffening material coats the inside of the cartridge and substantially flows along the inside surface of the compartment to extend around the inner surface as well as extend substantially along the axial length of the compartment.

In those embodiments in which the stiffening material is injected into the compartment for the catalyst mastic, the thin layer that is formed on the inner surface may not only stiffen the cartridge but also slow water permeation from catalyst through the packaging film of the cartridge. However, regardless of whether substantial water permeation continues to occur from the compartment with the layer of stiffening material, the cartridge has rigidity desired by customers.

Large particles of stiffening material can be created during shredding of the cartridge package and mixing of the components through spinning of a bolt proximate the cartridge. Advantageously, the large particles can enhance mixing and provide higher anchorage strength of the grouted bolt (e.g., bolt anchorage strength and modulus).

In another exemplary embodiment, polyester resin or methyl methacrylate resin catalyst is injected into the compartment of the cartridge for the catalyst mastic to form a thin layer on the inner surface thereof. The resin may react with the BPO in the catalyst and harden, thus stiffening the cartridge and providing a thicker wall for the catalyst compartment so as to slow water permeation therefrom.

In another exemplary embodiment, a material that reacts with the catalyst mastic is injected into the compartment of the cartridge therefor to form a thin layer on the inner surface of the compartment. The material may provide a thin layer that may be hard, semi-hard, or soft, but stops or slows water loss from the catalyst mastic through the cartridge film when contained in the compartment.

In some cases, the thin layer of material on the inner surface(s) of the cartridge may be hardened by exposing the cartridge to radiation (e.g., light of a particular wavelength).

In some cases, the thin layer of stiffening material on the inner surface(s) of the cartridge may be hardened by exposing the cartridge to radiation to heat the stiffening material. For example, if a polyester resin is used as the stiffening material, such a resin when heated above 60° C. may harden without an initiator.

In another exemplary embodiment, stiffening material is injected into the center of the compartment of a cartridge to harden in situ and form a solid rod that for example is between 0.125 inch and 0.5 inch in thickness for a substantial length of the compartment. Such a stiffening rod, however, also is sufficiently friable or brittle such that during bolt insertion and spinning, the stiffening rod crumbles and is mixed in the resin and catalyst.

In some embodiments, filler in the form of calcium sulphate hemihydrate is added to the resin mastic and/or catalyst mastic in the cartridges.

In some embodiments, the resin mastic portion of the cartridge is 5-20% polyester resin and 80-95% inorganic filler such as calcium sulphate dihydrate (i.e., gypsum). The inorganic filler particles may be greater than 3/16 inch in largest dimension. In some embodiments, at least 10% of the inorganic filler particles are greater than 3/16 inch in largest dimension.

During experimental cartridge production with calcium sulphate hemihydrate used as stiffening material, one problem encountered during manufacture was the setting of the calcium sulphate hemihydrate within 20 minutes in the pumps. In effect, a shutdown of the production line clogged the line because remaining calcium sulphate hemihydrate set within the pump when flow stopped. Moreover, calcium sulphate hemihydrate accumulated within dead volume in the pumps, also causing clogging. In order to counteract this problem, a set retarder can be added to the calcium sulphate hemihydrate. Set retarders include polyacrylic acid, animal protein, chelating agent, and phosphate compounds not containing calcium, as well as those disclosed in U.S. Pat. No. 4,661,161 to Jakacki et al., the entire content of which is incorporated herein by reference thereto. Preferably, the set retarder retards set time of the stiffening material for 1 to 4 hours (e.g., long enough for manufacturing). A preferred exemplpary retarder is a combination of polyacrylic acid and a chelating agent such as disclosed in U.S. Pat. No. 5,653,797 to Patel, the entire content of which is incorporated herein by reference thereto.

Preferably, the calcium sulphate hemihydrate is prevented from setting in the pump for as long as possible, while it relatively quickly sets in the cartridge to form a stiff layer. Because the stiffening material sets quickly in the cartridge, quality control can be achieved quickly. Thus, for example, quality control testing can be accomplished quickly and if a cartridge fails testing, production can be stopped and adjusted so that a long period of time does not pass (e.g., one day) with substandard product being produced.

In an exemplary embodiment, a compartment of the cartridge includes calcium sulphate hemihydrate, water, and a set retarder. That compartment optionally may be include either resin mastic or catalyst mastic. The set retarder may be a hydration inhibitor. An exemplary hydration inhibitor is an aqueous solution containing pentasodium diethylenetriaminetetraacetate such as NO-GO Hydration Inhibitor sold by United States Gypsum Company. NO-GO includes more than 50 wt % water, less than 45 wt % pentasodium diethylenetriaminetetraacetate (chelating agent), less than 5 wt % sodium glycolate, 1 wt % sodium hydroxide (pH modifier), and 1 wt % trisodium nitrilotriacetate (chelating agent).

In another exemplary embodiment, a compartment of the cartridge includes calcium sulphate hemihydrate, water, a set retarder, and an activator. The activator reacts with the retarder so it no longer retards the hydration of the calcium sulphate hemihydrate. Exemplary activators include soluble ions of iron, aluminum, zinc, and copper such as ferric chloride, ferric sulfate, aluminum sulfate, and zinc sulfate. In practice, calcium sulphate hemihydrate, water, a set retarder are delivered by a first pump to the compartment while activator is separately delivered to the compartment by a second pump.

Preferably, when the calcium sulphate hemihydrate, water, and set retarder pass through the pump, prior to injection into the cartridge, the calcium sulphate hemihydrate does not hydrate and solidify. These materials are delivered to a compartment that optionally may include either resin mastic or catalyst mastic. An activator is added proximate the point of delivery of the calcium sulphate hemihydrate, water, and set retarder to the cartridge so that rapid hydration and formation of solid occurs, thereby providing either stiffening on the inner surface of the compartment or hardened filler particles within the compartment.

In another exemplary embodiment, a two compartment cementitious cartridge has retarded cement and water in one compartment, and activator in the other compartment optionally along with thickening agent, liquefying agent, filler (e.g., reacted calcium sulphate hemihydrate or calcium carbonate (limestone)), and/or water. The retarded cement, for example, may be calcium sulphate hemihydrate or Portland cement. Optionally, one compartment may include resin mastic and the other compartment may include catalyst mastic. In one exemplary embodiment, more activator may be provided at one end of the cartridge than the other end. In yet another embodiment, more retarder may be provided at one end of the cartridge than the other end. A two compartment cartridge (similar to polyester resin cartridges in function) thus can be manufactured using automated packaging equipment. One compartment may include a retarded cementitious composition (e.g., a slurry of cement and water) while the other compartment may include an activator and optionally water. Advantageously, cement grouts can be manufactured at high rate, field labor is eliminated, more uniform performance is provided, faster setting times can be achieved than present dry packages, a safer product can be produced than polyester grouts (e.g., no styrene and not flammable), and the cement has a lower cost than polyester.

The calcium sulphate hemihydrate will not set in the pump due to the presence of the retarder (but no activator).

If the production line is shut down, the introduction of activator may be discontinued while retarded calcium sulphate hemihydrate continues to flow, e.g. for another 30 seconds, to clear the line. Thus, shut-downs for indefinite periods of time are possible without concern that the stiffening material will harden within the pump.

In an alternate embodiment, activator is included in the cartridge in the resin mastic or the catalyst mastic. In such a design, the time when activator does not flow during shut-down can be eliminated and an extra pump is not needed to pump the activator.

The use of single compartment cartridges formed of a frangible casing is known, for example from U.S. Pat. No. 4,891,072 to Cooper. The multi-component grouting system disclosed therein has at least one component wherein the active ingredient is contained in the dispersed phase of a water-in-oil emulsion, the oil providing an effective barrier against mixing of the components thereby enabling the components to be stored indefinitely in direct contact. In contrast, in one exemplary embodiment of a different cartridge, a two compartment cartridge is provided with the first compartment including retarded calcium sulphate hemihydrate and a second compartment including activator.

Preferably, a progressive cavity pump is used to fill the cartridges.

In one exemplary embodiment, the flow of resin filler into a cartridge can be interrupted by substituting a fluid sealant without coarse particles to seal the end of the capsule. The fluid sealant may be injected so that the sealant only is located proximate the clipping regions of the cartridge. Preferably, the volume of sealant is such that it will not interfere with the hardening or performance of the resin mastic and/or catalyst mastic. Preferably, sealant injection is synchronized with the clipping head used in the cartridge manufacturing operation such that a clip is applied directly over the sealant. Thus, the cartridge ends may be substantially free of resin styrene. Concomitantly, there will be a reduction in waste due to fewer ruptured cartridges from clip tearing as compared to currently known cartridges with coarse, sharp filler particles that can become trapped under the clips during manufacture.

Potential sealants include water thickened with starch, bentonite or clays, methylcellulose and hypromellose water-soluble cellulose ethers (e.g., Dow Chemical Company's METHOCEL™), guar gum (guaran), or other thickening agent. Other potential sealants include foamed fluids or glues that air harden and do not contain volatiles that cause harmful fumes such as polyurethane adhesives such as used for caulking and polyvinyl acetate glues with the molecular formula $(C_4H_6O_2)_n$.

Another exemplary embodiment of an anchoring system for mines is a two-speed resin system. Two-speed resin systems are well-known for anchoring mine bolts and tendons to provide roof and side wall support in mines, as described for example in U.S. Pat. No. 7,775,745 to Simmons et al., the entire contents of which are incorporated herein by reference thereto. The resin systems are provided in capsules which are inserted into boreholes and subsequently punctured in a manner such that the contents are mixed and then allowed to solidify. The capsules may include two compartments. A first compartment may include a reinforced, thixotropic, polyester resin mastic (a fluid) as well as a retarded cementitious composition, while a second compartment may include an organic peroxide catalyst (also a fluid) and an activator. The resin and catalyst are segregated from one another in the capsule so that reaction is prevented prior to puncturing of the compartments. In an exemplary embodiment, resin mastic such as polyester resin mastic and catalyst mastic are provided at one end of the cartridge in their respective compartments, while calcium sulphate hemihydrate and activator are provided at the other end of both compartments of the cartridge. In use, when the bolt is inserted into and spun in a borehole to puncture the cartridge and mix the cartridge contents, the resin hardens and provides initial strength for example in 15-30 seconds while when the calcium sulphate hemihydrate hardens for example over the next 2 minutes to 24 hours, essentially full strength is provided by the grouting system.

Potential resins for use with the systems as described herein include, but are not limited to, polyester with a styrene monomer cross-linking agent as well as acrylates and acrylic resins and combinations thereof, unsaturated polyester resins dissolved in a suitable ethylenically unsaturated monomer or mixture of monomers such as styrene, alpha methyl styrene, vinyl toluene, and methyl methacrylate. Potential resins are provided in U.S. Pat. No. 3,731,791 to Fourcade et al. entitled "Securing of Fixing Elements Such as Anchor Bolts" and U.S. Pat. No. 7,411,010 B2 to Kish et al. entitled "Composition for Anchoring a Material in or to Concrete or Masonry," the entire contents of which are incorporated herein by reference thereto.

Potential catalysts for use with processing lubricants described herein include, but are not limited to, peroxide types such as benzoyl peroxide (BPO) with a water or oil base. Other such initiators include cyclohexane peroxide, hydroxy heptyl peroxide, 1-hydroxy cyclohexyl hydroperoxide-1, t-butyl hydroperoxide, 2,4-dichlorobenzoyl peroxide and the like, methyl ethyl ketone peroxide as well as inorganic peroxides alone or mixed with organic peroxides, such as sodium percarbonate, calcium peroxide, and sodium peroxide. Potential initiators are listed in U.S. Pat. No. 3,324,663 to McLean entitled "Rock Bolting," the entire content of which is incorporated herein by reference thereto.

In one exemplary embodiment, a package for a grouting system as disclosed herein may be subjected to a stiffness test. In accordance with the stiffness test, a length of 1 foot of the package is permitted to extend beyond the edge of a flat, elevated horizontal surface. The package passes the stiffness test if the 1 foot length remains substantially parallel to the horizontal surface, such that it does not crease and collapse downward from the elevated surface. In accordance with a further stiffness test, the package passes the test if after 5% mass loss from the time of manufacture of the package, the 1 foot length remains substantially parallel to the horizontal surface, such that it does not crease and collapse downward from the elevated surface.

In another exemplary embodiment, the package comprises a hardenable material as disclosed herein, and the mixing torque of the contents of the compartments of the package increases proportionally more during mixing due to the friability of the hardened material which creates more surface area of particles exposed to other contents of the compartments during mixing.

While various descriptions of the present invention are described above, it should be understood that the various features can be used singly or in any combination thereof. Therefore, this invention is not to be limited to only the specifically preferred embodiments depicted herein. For example, in the exemplary embodiments disclosed herein, calcium sulfate hemihydrate instead may be replaced with other hydratable cements such as Portland cement.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:
1. A grouting article for anchoring a reinforcement in a mine comprising:

a sealed package comprising a tubular member formed of polymer film and having discrete first and second compartments;

hardenable cementitious material comprising a hydratable substance and water disposed in the first compartment; and catalyst mastic disposed in the second compartment;

wherein the hardenable cementitious material forms a hardened stiffening material within the sealed package.

2. The grouting article of claim 1, wherein the first end sets faster than the second end.

3. The grouting article of claim 1, wherein the second compartment further comprises at least one component selected from the group consisting of thickening agent, liquefying agent, filler, and water.

4. The grouting article of claim 1, wherein the hardenable cementitious material comprises calcium sulphate hemihydrate.

5. The grouting article of claim 1, wherein the hardenable cementitious material comprises Portland cement.

6. The grouting article of claim 1, wherein resin mastic is disposed in one of the first and second compartments and catalyst mastic is disposed in another of the first and second compartments.

7. The grouting article of claim 1, wherein retarder is disposed in the first compartment, wherein the retarder varies in amount from a first end of the package to a second end of the package.

8. The grouting article of claim 1, wherein the hardenable cementitious material comprises a slurry of cement and water.

9. The grouting article of claim 1, wherein activator is disposed in resin mastic or catalyst mastic.

10. The grouting article of claim 1, further comprising fluid sealant disposed proximate the first and second ends of the package.

11. The grouting article of claim 1, wherein a polyester resin mastic is further disposed in the first compartment.

12. The grouting article of claim 1, wherein an organic peroxide catalyst is further disposed in the second compartment.

13. The grouting article of claim 1, wherein:

resin mastic is disposed in the first compartment proximate a first end of the package and the hardenable cementitious material is disposed in the first compartment proximate a second end of the package; and catalyst mastic is disposed in the second compartment proximate the first end of the package and activator is disposed in the second compartment proximate the second end of the package.

14. The grouting article of claim 1, wherein resin mastic comprising polyester is disposed in the first compartment.

15. The grouting article of claim 1, wherein catalyst mastic comprising peroxide is disposed in the second compartment.

16. The grouting article of claim 1, wherein the hardenable cementitious material is disposed as a layer on an inner surface of the first compartment.

17. The grouting article of claim 16, wherein the layer has a thickness between 0.005 inch and 0.125 inch.

18. The grouting article of claim 17, wherein the hardenable cementitious material comprises Portland cement.

19. The grouting article of claim 17, wherein the hardenable cementitious material comprises calcium sulphate hemihydrate.

20. The grouting article of claim 16, wherein the layer coats the inner surface of the first compartment along an axial length thereof.

21. The grouting article of claim 1, wherein catalyst and hardenable cementitious material are further disposed in the second compartment.

22. The grouting article of claim 1, wherein the first compartment comprises an inner surface and the hardenable cementitious material is disposed remote from the inner surface.

23. The grouting article of claim 22, wherein the hardenable cementitious material is disposed proximate a central longitudinal axis of the first compartment.

24. The grouting article of claim 23, wherein the hardenable cementitious material is a rod extending from a first end of the first compartment to a second end of the first compartment.

25. The grouting article of claim 23, wherein the hardenable cementitious material is a rod having a thickness between 0.125 inch and 0.5 inch.

26. The grouting article of claim 22, wherein the hardenable cementitious material is disposed proximate a longitudinal axis of the first compartment.

27. The grouting article of claim 26, wherein the hardenable cementitious material is a rod extending from a first end of the first compartment to a second end of the first compartment.

28. The grouting article of claim 26, wherein the hardenable cementitious material is a rod having a thickness between 0.125 inch and 0.5 inch.

29. The grouting article of claim 1, wherein the first compartment comprises 5% to 50% hardenable cementitious material by volume.

30. The grouting article of claim 29, wherein the hardenable cementitious material comprises particles greater than 3/16 inch in largest dimension.

31. The grouting article of claim 29, wherein at least 10% of the particles are greater than 3/16 inch in largest dimension.

32. The grouting article of claim 1, wherein the first compartment comprises 50% to 95% resin mastic by volume.

33. The grouting article of claim 32, wherein the resin mastic comprises polyester resin.

34. The grouting article of claim 1, wherein at least one of the first and second compartments comprises calcium sulphate hemihydrate, water, and a set retarder.

35. The grouting article of claim 34, wherein the set retarder is a hydration inhibitor.

36. The grouting article of claim 34, wherein resin mastic is further included in the compartment with the calcium sulphate hemihydrate, water, and set retarder.

37. The grouting article of claim 34, wherein catalyst mastic is further included in the compartment with the calcium sulphate hemihydrate, water, and set retarder.

38. The grouting article of claim 1, further comprising activator disposed in the second compartment and comprising soluble ions of at least one element consisting of iron, aluminum, zinc, and copper.

39. The grouting article of claim 1, further comprising activator disposed in the second compartment.

40. The grouting article of claim 39, wherein the activator varies in amount from a first end of the package to a second end of the package.

41. The grouting article of claim 40, wherein the first end sets faster than the second end when the cementitious material and the activator are combined.

42. The grouting article of claim 1, wherein the hardenable cementitious material is retarded.

43. The grouting article of claim 1, wherein a reinforced, thixotropic polyester resin mastic is further disposed in the first compartment.

44. A grouting article for anchoring a reinforcement in a mine comprising:
a package comprising a tubular member formed of polymer film and having discrete first and second compartments;
a reacting, hardenable material disposed in at least one of the first and second compartments;
a polyester resin mastic disposed in the first compartment; and
an inorganic peroxide catalyst disposed in the second compartment.

45. The grouting article of claim 44, wherein:
the package is sealed; and
the reacting, hardenable material forms a stiffening material within the sealed package.

46. The grouting article of claim 45, wherein the reacting, hardenable material comprises Portland cement.

47. The grouting article of claim 45, wherein the reacting, hardenable material comprises calcium sulphate hemihydrate.

48. A grouting article for anchoring a reinforcement in a mine comprising:
a package comprising a tubular member formed of polymer film and having discrete first and second compartments;
a reacting, hardenable cementitious material comprising a hydratable substance and water disposed in the first compartment; and
an organic peroxide catalyst disposed in the second compartment.

49. The grouting article of claim 48, further comprising:
resin mastic disposed in the first compartment; and
activator disposed in the second compartment.

50. The grouting article of claim 49, wherein:
the resin mastic comprises a polyester resin mastic; and
the hardenable cementitious material comprises calcium sulphate hemihydrate.

51. The grouting article of claim 49, wherein:
the resin mastic comprises a polyester resin mastic; and
the hardenable cementitious material comprises Portland cement.

52. A grouting article of for anchoring a reinforcement in a mine comprising:
a sealed, tubular member formed of polymer film and having discrete first and second compartments;
reacting, hardenable cementitious material comprising a hydratable substance and water disposed in at least one of the first and second compartments; and
mastic disposed in at least one of the first and second compartments, wherein the mastic is selected from the group consisting of catalyst mastic, resin mastic, or both.

53. The grouting article of claim 52, wherein the catalyst mastic is disposed in the first compartment and the resin mastic is disposed in the second compartment.

54. The grouting article of claim 53, wherein the reacting, hardenable cementitious material is disposed in the first compartment.

55. The grouting article of 54, further comprising a set retarder in the first compartment.

56. The grouting article of claim 55, wherein the set retarder is a hydration inhibitor.

57. The grouting article of claim 55, wherein the reacting, hardenable cementitious material comprises a slurry of cement and water.

58. The grouting article of claim 55, wherein the reacting, hardenable cementitious material comprises Portland cement.

59. The grouting article of claim 55, wherein the reacting, hardenable cementitious material comprises calcium sulphate hemihydrate.

60. The grouting article of claim 53, wherein the reacting, hardenable cementitious material is disposed in the second compartment.

61. The grouting article of claim 60, further comprising set retarder in the second compartment.

62. The grouting article of claim 61, wherein the set retarder is a hydration inhibitor.

63. The grouting article of claim 61, wherein the reacting, hardenable cementitious material comprises a slurry of cement and water.

64. The grouting article of claim 61, wherein the reacting, hardenable cementitious material comprises Portland cement.

65. The grouting article of claim 61, wherein the reacting, hardenable cementitious material comprises calcium sulphate hemihydrate.

66. The grouting article of claim 53, wherein the reacting, hardenable cementitious material is disposed in the first and second compartments.

67. The grouting article of claim 53, wherein the reacting, hardenable cementitious material comprises particles greater than 3/16 inch in largest dimension.

68. A grouting article for providing roof or sidewall support comprising:
a sealed, tubular member formed of polymer film and having first and second compartments;
organic peroxide catalyst mastic disposed in the first compartment;
polyester resin mastic disposed in the second compartment; and
reacting, hardenable material disposed in at least one of the first and second compartments.

69. The grouting article of claim 68, wherein the reacting, hardenable material comprises calcium sulphate hemihydrate.

70. The grouting article of claim 53, wherein one of the first and second compartments further comprises a chelating agent.

71. The grouting article of claim 1, wherein one of the first and second compartments further comprises two chelating agents.

* * * * *